United States Patent
Frieden et al.

(10) Patent No.: US 10,635,998 B2
(45) Date of Patent: Apr. 28, 2020

(54) TASK ASSIGNMENT SYSTEM AND METHOD FOR OPERATING A TEST CELL

(71) Applicant: Caterpillar Inc., Peoria, IL (US)

(72) Inventors: Douglas Edward Frieden, Germantown Hills, IL (US); Matthew John Hallam Larkins, Dunlap, IL (US); Michael S. Bond, Chillicothe, IL (US); Abhijit Patkar, Dunlap, IL (US); Naveen Kumar Sha Aproop, Peoria, IL (US); Mehar Prakash Gourishetty, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1133 days.

(21) Appl. No.: 14/987,182

(22) Filed: Jan. 4, 2016

(65) Prior Publication Data

US 2017/0193422 A1  Jul. 6, 2017

(51) Int. Cl.
| | |
|---|---|
| *G06Q 10/06* | (2012.01) |
| *G06Q 10/00* | (2012.01) |
| *G01M 15/05* | (2006.01) |
| *G07C 5/08* | (2006.01) |

(52) U.S. Cl.
CPC ........... *G06Q 10/063112* (2013.01); *G06Q 10/06311* (2013.01); *G06Q 10/06316* (2013.01); *G06Q 10/06395* (2013.01); *G06Q 10/063114* (2013.01); *G06Q 10/20* (2013.01); *G01M 15/05* (2013.01); *G05B 2219/24048* (2013.01);

(Continued)

(58) Field of Classification Search
None
See application file for complete search history.

(56) References Cited

U.S. PATENT DOCUMENTS

| | | | |
|---|---|---|---|
| 6,687,596 B2 | 2/2004 | Humerickhouse et al. | |
| 8,606,538 B2 * | 12/2013 | Cahon | G01R 31/008 702/121 |

(Continued)

OTHER PUBLICATIONS

Martyr, "Engine Testing: The Design, Building, Modification and Use of Powertrain Test Facilities," 2012, Elsevier, pp. 299-333 (Year: 2012).*

(Continued)

*Primary Examiner* — Ivan R Goldberg
(74) *Attorney, Agent, or Firm* — Miller, Matthias & Hull

(57) ABSTRACT

A computing device may be disposed in a command center positioned remotely from each test cell of a plurality of test cells of a testing facility. The computing device may include a visual display disposed in the command center and may include a network transceiver configured to receive monitored parameters of a test object disposed in each test cell. The computing device may include a command center module in communication with, at least, the network transceiver and the visual display. The command center module may be configured to execute instructions for: presenting, via the visual display, tests associated with the test object; receiving the monitored parameters of the test object; presenting, via the visual display, tasks associated with the tests; selectively assigning the tasks to a staff member; and communicating the assigned task to the staff member for performing the assigned task associated with the test object.

20 Claims, 5 Drawing Sheets

(52) U.S. Cl.
CPC . *G06Q 10/0631* (2013.01); *G06Q 10/063116* (2013.01); *G07C 5/0808* (2013.01); *G07C 5/0841* (2013.01)

(56) References Cited

U.S. PATENT DOCUMENTS

| | | | | |
|---|---|---|---|---|
| 2003/0055666 | A1* | 3/2003 | Roddy | B61L 27/0094 705/305 |
| 2003/0114966 | A1* | 6/2003 | Ferguson | G06F 11/2294 701/31.4 |
| 2004/0158568 | A1* | 8/2004 | Colle | G06Q 10/06 |
| 2008/0263399 | A1* | 10/2008 | Cousin | G05B 23/0248 714/26 |
| 2009/0199880 | A1* | 8/2009 | Wentworth | B60S 3/06 134/123 |
| 2009/0307027 | A1* | 12/2009 | Charbeneau | G06Q 10/087 705/305 |
| 2010/0138701 | A1* | 6/2010 | Costantino | G05B 23/0272 714/49 |
| 2013/0136656 | A1* | 5/2013 | Okada | G01N 33/0004 422/52 |
| 2013/0158777 | A1* | 6/2013 | Brauer | G06Q 10/20 701/31.4 |
| 2013/0185001 | A1* | 7/2013 | Cardoso | G01M 15/102 702/24 |
| 2013/0339892 | A1* | 12/2013 | Watanabe | G01M 17/0072 715/771 |
| 2014/0032158 | A1 | 1/2014 | Liang | |
| 2014/0200938 | A1 | 7/2014 | Aprin et al. | |
| 2015/0199854 | A1* | 7/2015 | Olsen, III | G06Q 10/06 701/29.3 |

OTHER PUBLICATIONS

Martyr, "Engine Testing: Theory and Practice," 3rd Ed., 2007, Elsevier, pp. 1-16, 47-107, and 216-241 (Year: 2007).*

* cited by examiner

TASK ASSIGNMENT SYSTEM AND METHOD FOR OPERATING A TEST CELL

TECHNICAL FIELD

The present disclosure relates generally to testing facilities and, more particularly, relates to systems and methods for assigning tasks for operating a test cell in such testing facilities.

BACKGROUND

At some testing facilities, a test cell or group of test cells may require multiple on-location operators to perform and monitor specific tasks. For example, when testing the performance of an engine a person or a group of people may be assigned to operate a particular engine test cell or group of engine test cells by performing and monitoring certain tasks on a test object in the assigned test cells. In some instances, the tasks may be time dependent such that during the waiting period for the tasks to be performed, an assigned operator may be underutilized. For example, the assigned operator may be available for assignment to perform another task in a different test cell, but instead, is restricted to the assigned test cell and cannot be assigned to perform the other task in the different test cell.

United States Patent Application Publication No. 2014/0200938 (the '938 publication) discloses a financial consolidation process command center. The financial consolidation process command center of the '938 publication includes associating financial consolidation tasks for business entities with respective roles and assigning those roles to persons who are responsible for completion of such tasks. While effective, the assigning of roles in the financial consolidation process command center of the '938 publication merely assigns roles without basing the assignments on the availability of the person nor the time requirements of completing the roles.

SUMMARY

In accordance with an aspect of the disclosure, a computing device is provided. The computing device may be disposed in a command center and the command center may be positioned remotely from each test cell of a plurality of test cells of a testing facility. The computing device may include a visual display disposed in the command center and may include a network transceiver configured to receive monitored parameters of a test object disposed in each test cell of a plurality of test cells. The computing device may include a command center module in communication with, at least, the network transceiver and the display. The command center module may be configured to execute instructions for: presenting, via the visual display, tests associated with the test object; receiving the monitored parameters of the test object; presenting, via the visual display, tasks associated with the tests; selectively assigning the tasks to a staff member; and communicating the assigned task to the staff member for performing the assigned task associated with the test object.

In accordance with another aspect of the disclosure, a system for remotely monitoring and remotely controlling each test cell of a plurality of test cells in a testing facility is provided. The system may include a test disposed in each test cell of the plurality of test cells for testing. A dynamometer may be operatively coupled to the test object. The dynamometer may be configured to control the test object during testing. A plurality of sensors may be disposed on the test object for monitoring parameters of the test object. A test cell computing device may be disposed in each test cell. Each test cell computing device may be in communication with the dynamometer and with the plurality of sensors. Each test cell computing device may be configured to control the dynamometer and receive the monitored parameters from the plurality of sensors. Each mobile computing device of a plurality of mobile computing devices may be in wireless communication with the test cell computing device. A command computing device may be disposed in a command center positioned remotely from the testing facility. The command computing device may be in communication with the test cell computing device and each mobile computing device. The command computing device may include a command center module in communication, with at least, a visual display of the command computing device. The command computing device may be configured to: present, on the visual display, tests associated with the test object; receive, via each test cell computing device, the monitored parameters of the test object monitored by the plurality of sensors; present, on the visual display, tasks associated with the tests; selectively assign the tasks to one of a supervisor, a technician, and a roaming operator; and communicate wirelessly the assigned task to the mobile computing device associated with the roaming operator for performing the assigned task associated with the test object.

In accordance with yet another aspect of the disclosure, a method for remotely monitoring and remotely controlling each test cell of a plurality of test cells in a testing facility is provided. The method may entail scheduling tests to be performed on the test object. Another step may be arming each test cell to verify and indicate a safe testing state for corresponding test cells. Yet another step may be presenting, via a graphical user interface displayed on a command center computing device, test bars representing each test scheduled to be performed on each test object. A further step may be presenting, via the graphical user interface, task identifiers representing tasks required to be performed in association with each test scheduled to be performed on each test object. A still further step may be selectively assigning the tasks to a staff member by dragging the corresponding task identifier to one of a supervisor profile, a technician profile, and a roaming operator profile. The supervisor profile, the technician profile, and the roaming operator profile may be presented via the graphical user interface displayed on the command center computing device. An even further step may be communicating the assigned task to one of a mobile computing device associated with the roaming operator profile, a remote computing device associated with the technician profile, and the command center computing device associated with the supervisor profile alerting to perform the assigned task associated with the test object.

These and other aspects and features of the present disclosure will be more readily understood upon reading the following detailed description when taken in conjunction with the accompanying drawings.

DETAILED DESCRIPTION

Figure 1:
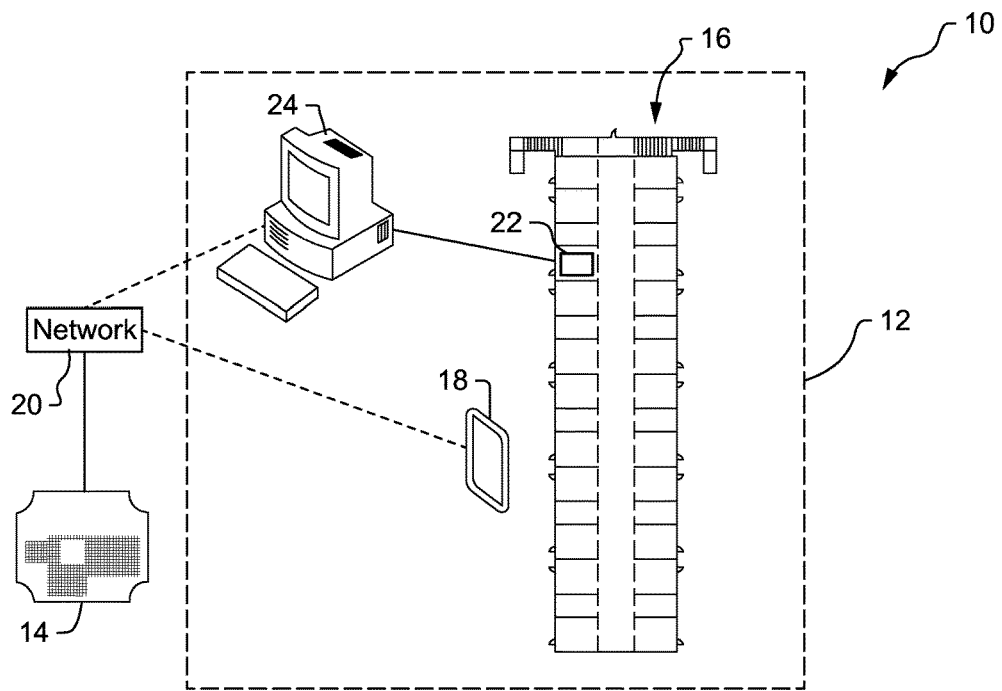
FIG. 1 is a schematic diagram of an exemplary task assigning system, in accordance with an embodiment of the present disclosure.

Referring now to FIG. 1, an exemplary system constructed in accordance with the present disclosure is generally referred to by reference numeral 10. The system 10 may be a task monitoring and assigning system, which may include a testing facility 12 and a command center 14. The testing facility 12 may include a plurality of test cells 16 and a plurality of mobile computing devices 18. As non-limiting examples, the command center 14 may be located in the testing facility 12 remotely from the plurality of test cells 16 or the command center 14 may be located remotely from the testing facility 12 at a substantial distance such as in another facility, city, state, or country. Communication between the command center 14, each test cell of the plurality of test cells 16, and each mobile computing device of the plurality of mobile computing devices 18 may be accomplished via a network 20, wherein the communicative links are depicted as dotted lines. The network 20 may include connections such as wire, fiber optic cables, or wireless communication links and may be any network such as the Internet, a WLAN, a WAN, a personal network, or any other network for connecting each mobile computing device of the plurality of mobile computing devices 18, any computing device associated with the command center 14, any computing device associated with each test cell of the plurality of test cells 16 to each other, and/or to any other capable computing device.

The testing facility 12 may test a wide range of industrial, earthmoving, agricultural, automotive, aerospace, and transportation machine components. For example, a test object 22 may be tested in each test cell of the plurality of test cells 16. As non-limiting examples, the test object 22 may be an engine for a loader, an excavator, a dozer, a motor grader, a tractor, a truck, a backhoe, a mining vehicle, an on-highway vehicle, a locomotive, agricultural equipment, a car, and an airliner, and other machine components associated with such machines such as, but not limited to, transmissions, hydraulic pumps, airfoils, and batteries, to name a few.

Figure 2:
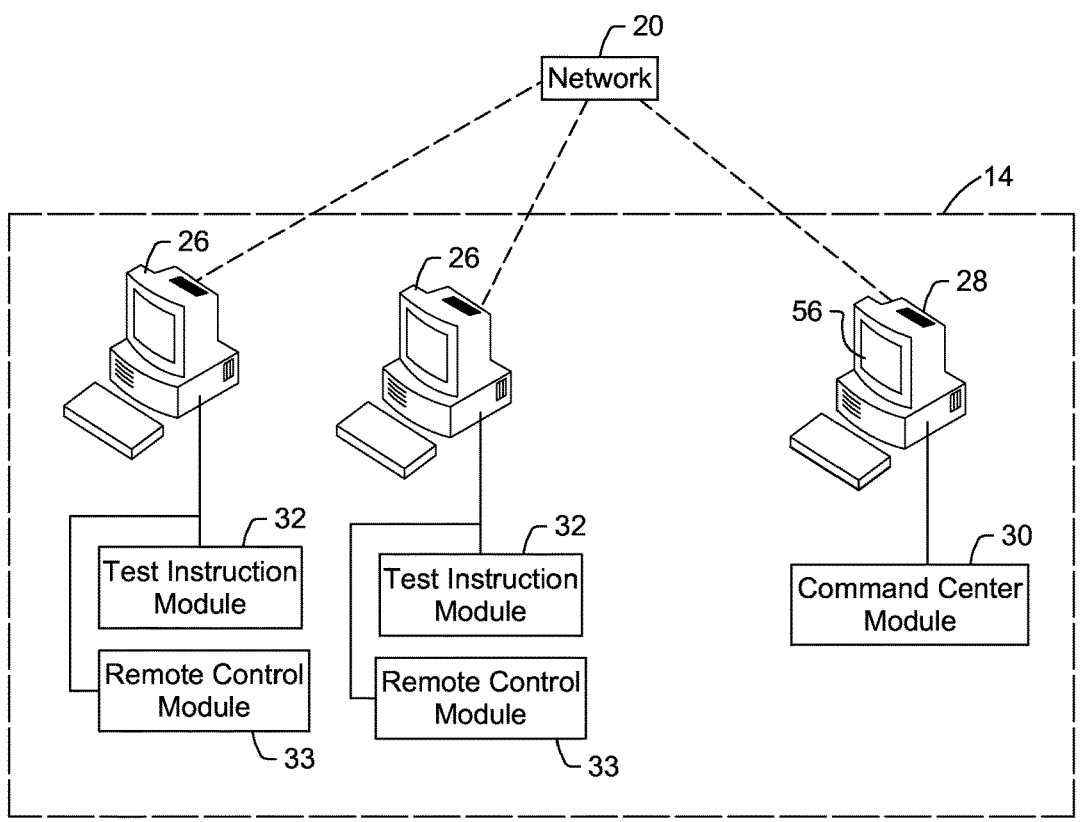
FIG. 2 is a schematic diagram of an exemplary command center, in accordance with an embodiment of the present disclosure.

Each test cell of the plurality of test cells 16 may be associated with a test cell computing device 24, which may include multiple test cell computing devices, to control and monitor the test object 22. The test cell computing device 24 may be in communication with each mobile computing device of the plurality of mobile computing devices 18 and with the computing devices associated with the command center 14 via the network 20. Each mobile computing device 18 may be, for example, a tablet computer, a cellular phone, a laptop computer, or any other type of mobile computing device. With reference to FIG. 2, for example, the command center 14 may include a plurality of remote computing devices 26 and a command computing device 28, which may all be in communication with each other, with each test cell computing device 24, and with each mobile computing device 18 via the network 20. The command computing device 28 may include a command center module 30 configured to monitor and control each test cell of the plurality of test cells 16 such that tasks required to be performed on the test object 22 may be tracked and assigned. Each remote computing device of the plurality of remote computing devices 26 may include a test instruction module 32 configured to receive input information for creating and scheduling various tests to be performed on test objects 22 in any of the plurality of test cells 16. Moreover, each remote computing device of the plurality of remote computing devices may also include a remote control module 33 configured to selectively control each test cell computing device 24 in each test cell of the plurality of test cells 16 such that each test cell computing device 24 may be selectively controlled remotely from the command center 14 for troubleshooting or controlling the test object 22.

Figure 3:
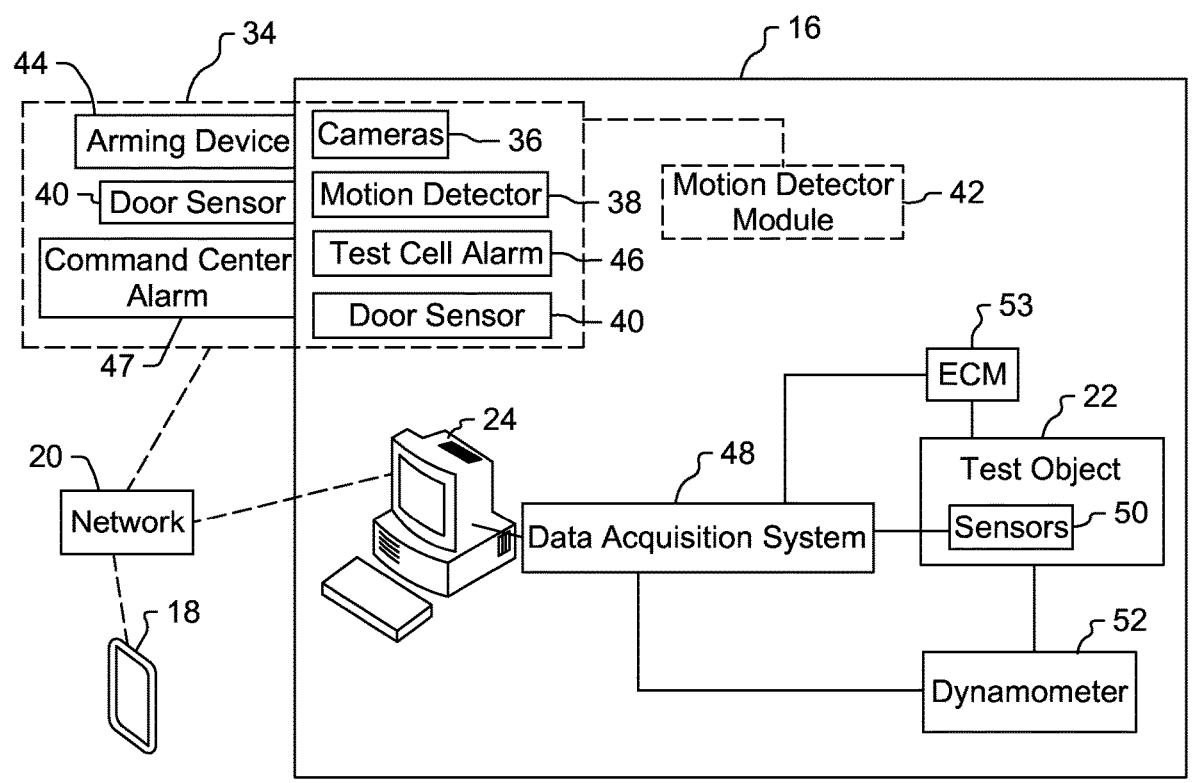
FIG. 3 is a schematic diagram of an exemplary test cell, in accordance with an embodiment of the present disclosure.

Referring to FIG. 3, each test cell of the plurality of test cells 16 may include a safety system 34, configured for ensuring the safety of personnel, which may be in communication with the command center module 30 of the command computing device 28 via the network 20 such that the command center module 30 may monitor and control the safety system 34. The safety system 34 may also be in communication with the test cell computing device 24 to also monitor and control the safety system 34. Moreover, safety system 34 may include a plurality of cameras 36, a motion detector 38, door sensors 40 that may be disposed on the interior and/or exterior of a door to each test cell 16, a motion detector module 42, an arming device 44, a test cell alarm 46 disposed interior of each test cell 16, and a command center alarm 47 disposed in the command center 14. As non-limiting examples, the arming device 44 may be a keypad, a reader, or a quick response (QR) code sticker, which may be scanned by a QR code reader on a mobile computing device 18. The arming device 44 may be configured to receive arming input, after a test cell 16 has been verified to be in a safe testing state, to indicate corresponding test cells 16 are safe for conducting test operations on the test object 22.

The plurality of cameras 36, the motion detector 38, and the door sensors 40 may be configured to monitor the test cells 16 to ensure that the test cells 16 remain in the safe testing state during testing of the test object 22 and may be configured to detect any anomalies in the test cells 16. Furthermore, when any of the plurality of cameras 36, the motion detector 38, and the door sensors 40 detect any anomalies during testing, the command center alarm 47 may be triggered to alert to an unsafe state of the test cells 16 so that the test cell 16 may be disarmed and tests are preventing from being started automatically. The command center alarm 47 may include audible alarms such as horns and speaker notifications and may include, separately or in addition to, visual alarms such as flashing lights, strobe lights, and flashing notifications displayed on a screen of any of the computing devices 18, 24, 26, 28. Moreover, in an exemplary embodiment, the test cell alarm 46 may be triggered, after the test cell 16 has been armed, with a countdown to alert to the start of a testing of the test object 22 so that any personnel in the test cell 16 may exit.

The motion detector module 42, via any of the computing devices 24, 26, 28, may be configured to receive and analyze information from the plurality of cameras 36. Similarly, the motion detector module 42 may detect any anomalies during testing such that the command center alarm 47 may be triggered to alert to an unsafe state of the test cells 16 so that the test cell 16 may be disarmed.

Each test cell computing device of the plurality of test cell computing devices 24 may include a data acquisition system 48. The data acquisition system 48 may be in communication with the test object 22 and with a plurality of testing sensors 50 that are disposed at various locations thereon to monitor parameters of the test object 22 such as, but not limited to, temperature, pressure flowrates, strains, speeds, torques, and gas concentrations, to name a few. The data acquisition system 48 may be configured to receive and continuously communicate the monitored parameters of the test object 22 to the command center module 30. Such monitored parameters may be monitored from the command center 14 via the command center computing device 28 so that warnings associated with a test may be generated for staff located in the command center 14. Additionally, the data acquisition system 48 may store or record selected parameters received from the plurality of testing sensors 50. Further, the data acquisition system 48 may be in communication with a dynamometer 52, which may be operatively coupled to the test object 22 for monitoring and controlling during testing. As one example, the dynamometer 52 may be operatively coupled to the load produced by the test object 22, which may be an engine. The data acquisition system 48 may also be configured to receive instructions from the test instruction module 32 to control the operations of both the test object 22 and the dynamometer 52.

In a further exemplary embodiment, the data acquisition system 48 may also be in communication with an engine control module (ECM) 53, which may be operatively coupled to the test object 22. The data acquisition system 48 may be configured to receive instructions from the test instruction module 32 to control the test object 22 via the ECM 53. As a non-limiting example, the ECM 53 may actuate various components of the test object 22, and in an example of the test object 22 being an engine, may actuate such components as, but not limited to, valves and solenoids to regulate the timing and amount of fuel injection.

Each mobile computing device 18 may be in communication with a data acquisition system 48 of each test cell 16 and may receive the monitored parameters of the test object 22. Each mobile computing device 18 may be configured to display and analyze the monitored parameters of the test object 22. Each mobile computing device 18 may also be in communication with the command center module 30 and configured to receive tasks to be performed on test objects 22 and to communicate the completion of such tasks. The tasks may be any manual tasks requiring the attention of a roaming operator such as, but not limited to, changing filters, setting restrictions, starting the test object 22, performing test cell safety checks, arming the test cell 16, and backing up settings. Furthermore, each mobile computing device 18 may be configured to communicate with the arming device 44 to arm each test cell 16, as described above, and may also be configured to receive manual input, such as by a roaming operator, to be archived for later reference. For example, a roaming operator may input a filter number assigned to a filter that was replaced on the test object 22.

Figure 4:
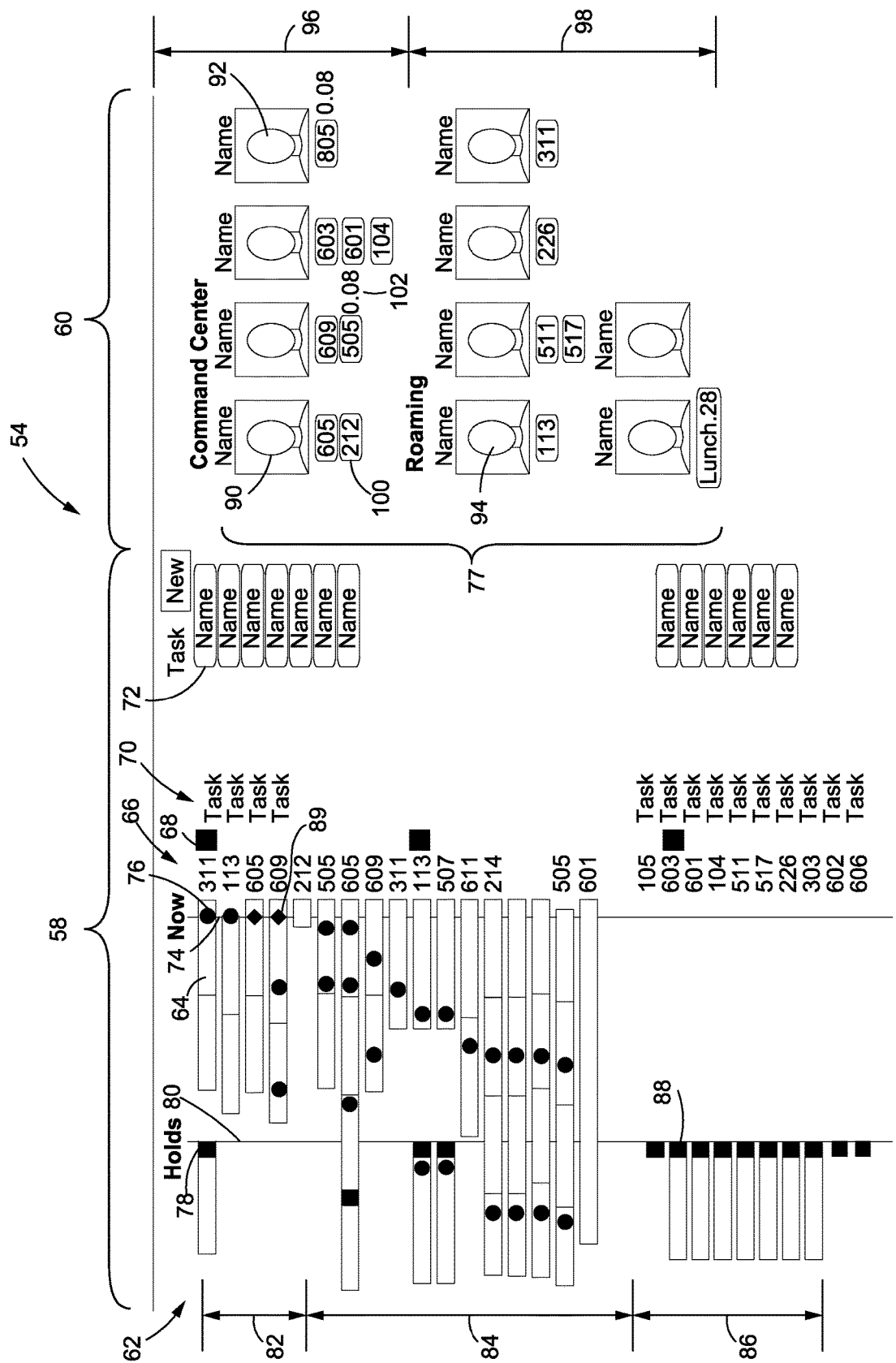
FIG. 4 is a pictorial illustration of an exemplary graphical user interface on a display screen, in accordance with an embodiment of the present disclosure.

With reference to FIGS. 2 and 4, the command center module 30 may provide a graphical user interface (GUI) 54, exemplarily shown in FIG. 4, to a display screen 56 of the command computing device 28. While the display screen 56 is illustrated as a single display screen, it is to be understood that the display screen 56 may include multiple display screens or monitors such as, but not limited to, desk monitors and wall monitors, which may be mounted to walls of the command center 14. The command center module 30 may present a monitoring pane 58 and a task assignment pane 60 via the GUI 54. Within the monitoring pane 58, the command center module 30 may present rows 62 of information corresponding to a particular test cell 16. Thus, the information in each row 62 may be displayed in corresponding columns to display such information as test progress represented by test bars 64, test cell room represented by test cell room identifier 66, task status change represented by task status change identifier 68, assigned task represented by task name identifier 70, and assigned staff name represented by assigned staff name identifier 72 which identifies a staff member assigned to a specific assigned task represented by task name identifier 70.

Moreover, a queue of tests may be scheduled to be performed on a test object 22 in a particular test cell 16 via the test instruction module 32 and may be represented with multiple test bars 64 in a row 62 such that each test bar 64 may be associated with a specific test. As such, a test that is currently in progress may be displayed adjacent to a first vertical line 74 representing present time while future tests may be displayed adjacent to the current test and further away from the first vertical line 74. The duration for a test to be completed may be represented by the length of a test bar 64. Additionally, before the completion of each test, a certain task may be required to be performed and may be represented by a task identifier 76. The task identifier 76 may be displayed within a corresponding test bar 64. As the performance of the task may be time sensitive, the task identifier 76 may be displayed on the test bar 64 to indicate the time at which the task needs to be performed such that, for example, the task identifier 76 may move from left to right along with the test bar 64 until reaching the first vertical line 74 to indicate that the test has been paused until the task is completed by an assigned staff member 77.

In other instances, a hold command may be scheduled, via the test instruction module 32, to occur initially when a test is created or to occur at a future time. The hold command may be represented by a hold identifier 78, which may be displayed prior to a test bar 64 representing a test that cannot begin to run until after the hold associated with the hold identifier 78 is completed. For example, the hold identifier 78 may be displayed between a test bar 64 representing a test that cannot begin to run until after the hold and a test bar 64 representing a test that is currently running or queued to run. A second vertical line 80 may be selectively positioned adjacent a hold identifier 78 to graphically depict a separation between tests that cannot begin to run until after the hold and tests that can run before the hold.

Further, the command center module 30 may present the rows 62 in vertical groupings to indicate tests that are currently running but require attention from a staff member 77 as represented in a first grouping 82, tests that are currently running and do not require immediate attention from a staff member 77 as represented in a second grouping 84, and tests that are not currently running as represented in a third grouping 86. Tests that are not currently running may be displayed in the third grouping 86 such that a task holding identifier 88 may be displayed adjacent the second vertical line 80 and prior to a test bar 64 representing the test that is not currently running. Moreover, tests displayed in the second grouping 84 may be selectively sorted to display task identifiers 76 of different test cells 16 by time in which the tasks need to be performed. Tests that are currently running but require attention from an operator may be indicated with a task identifier 76 or a warning identifier 89 displayed within the corresponding test bar 64 at the first vertical line 74.

Within the task assignment pane 60, the command center module 30 may present the available staff members 77 at the testing facility 12 such as the supervisor represented by the supervisor profile 90, the technicians represented by technician profiles 92, and the roaming operators represented by roaming operator profiles 94. The supervisor may be stationed in the command center 14 at the command computing device 28 and, as such, the supervisor profile 90 may be displayed in the command center section 96 of the task assignment pane 60. The technicians may similarly be stationed in the command center 14, but at one of the remote computing devices 26. Thus, the technician profiles 92 may also be displayed in the command center section 96 of the task assignment pane 60. The roaming operators may be stationed proximate the plurality of test cells 16 to roam thereabout and perform tasks on the test objects 22 as assigned and required. As such, the roaming operator profiles 94 may be displayed in the roaming section 98 of the task assignment pane 60.

Tasks may be assigned to the supervisor, the technicians, or the roaming operators by selecting a task identifier 76, a task holding identifier 88, or a warning identifier 89 from the monitoring pane 58 and dragging the task identifier 76, the task holding identifier 88, or the warning identifier 89 to a corresponding one of the supervisor profile 90, the technician profile 92, and the roaming operator profile 94 displayed on the task assignment pane 60. Once the task identifier 76, the task holding identifier 88, or the warning identifier 89 is dragged and dropped to one of the profiles 90, 92, 94, the test cell room number corresponding to the task identifier 76, the task holding identifier 88, or the warning identifier 89 may be displayed below the corresponding one of the profiles 90, 92, 94 as represented by a room display 100. For time sensitive tasks that are scheduled to be performed in the future, a countdown display 102 may be displayed adjacent the room display 100 representing the amount of time remaining until the time sensitive task may be performed.

In an exemplary embodiment, tasks may be manually created and assigned to one of the profiles 90, 92, 94.

Figure 5:
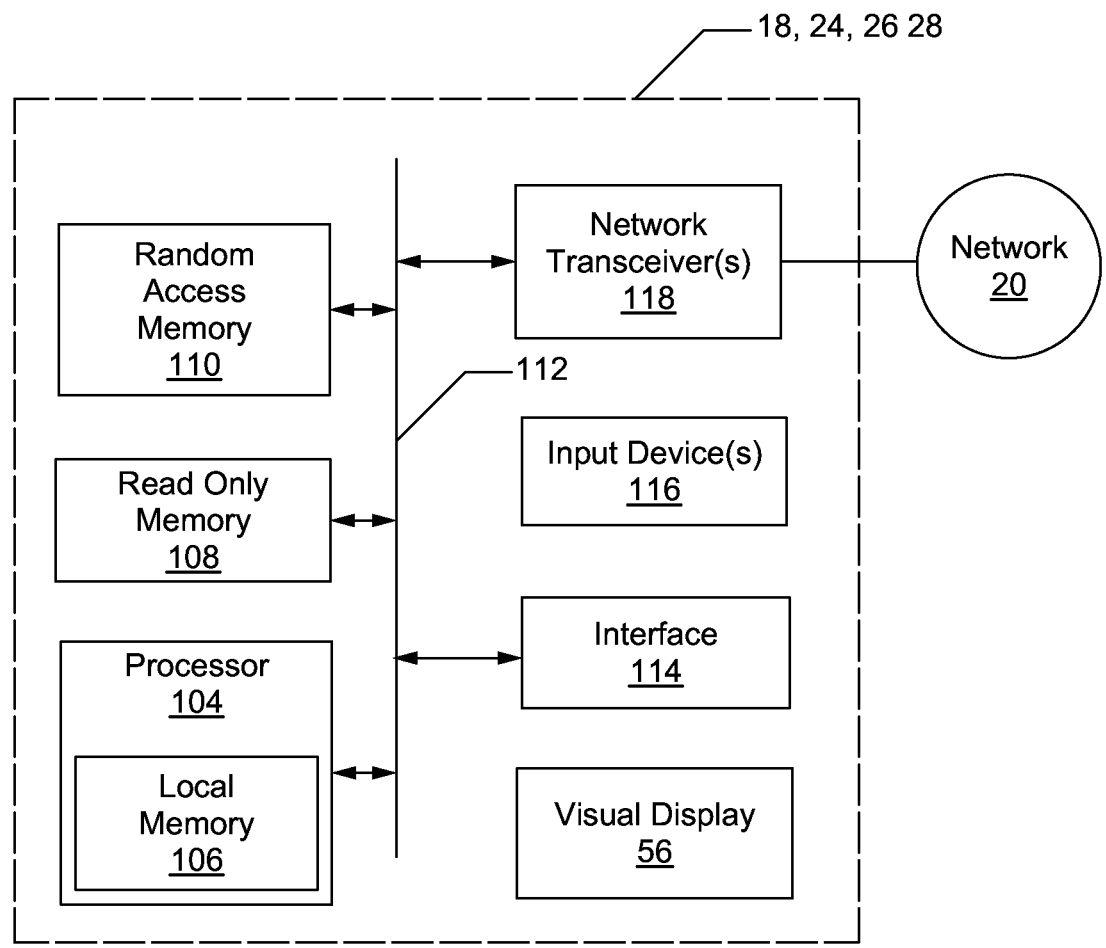
FIG. 5 is a block diagram illustrating components of an exemplary computer, in accordance with an embodiment of the present disclosure.
Figure 6:
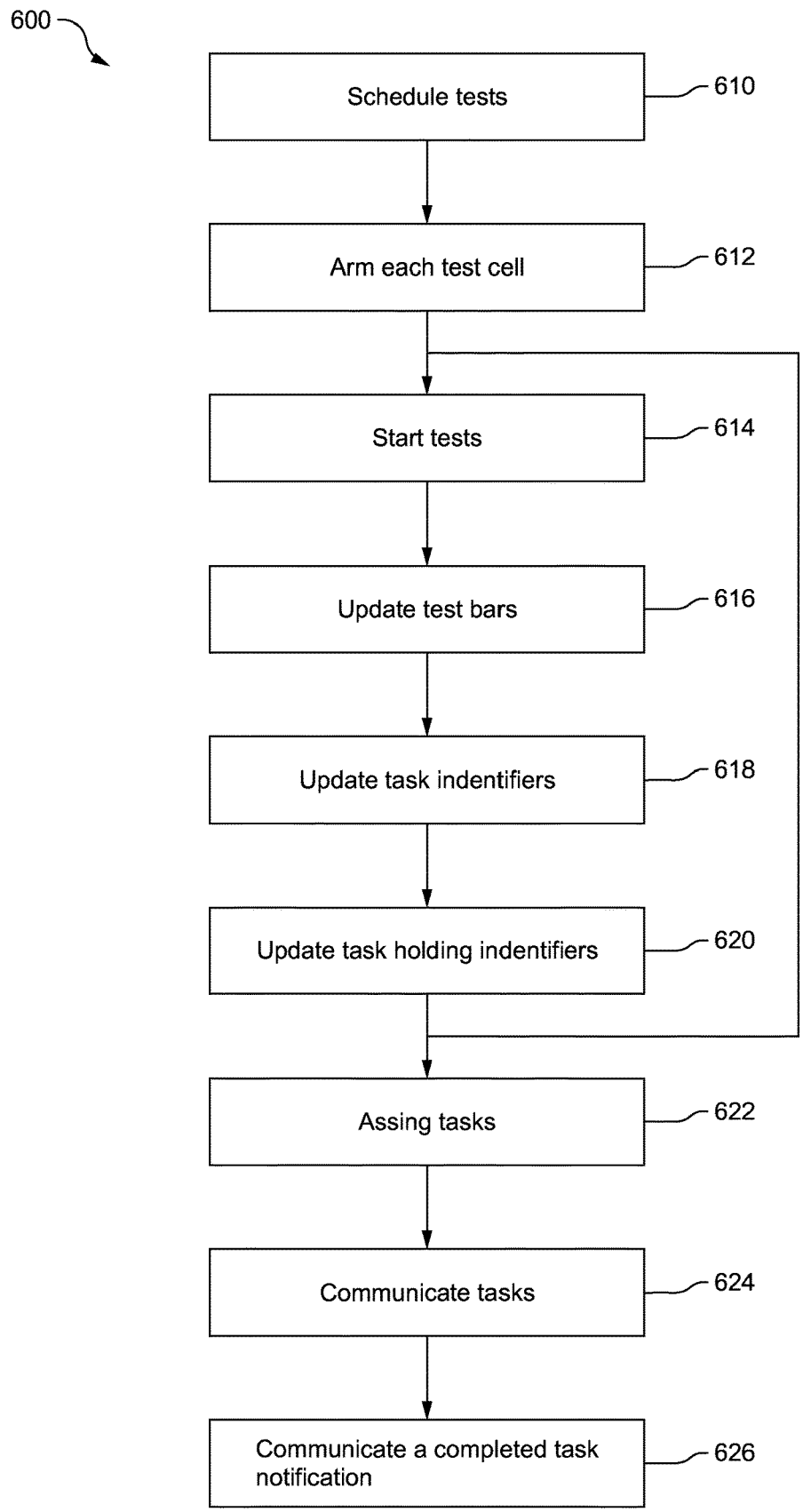
FIG. 6 is a flow chart illustrating a sample sequence of steps which may be practiced in accordance with an embodiment of the present disclosure.

FIG. 5 is a block diagram of example components of a computing device, such as each mobile computing device 18, each test cell computing device 24, each remote computing device 26, and the command computing device 28, capable of executing instructions to realize the disclosed system and methods for monitoring and controlling each test cell of the plurality of test cells 16 such that tasks required to be performed on the test object 22 may be tracked and assigned, as described above and/or capable of executing instructions to perform methods discussed below in reference to FIG. 6. Computing devices 18, 24, 26, 28 may include a processor 104 that may be, for example, implemented by one or more microprocessors or controllers from any desired family or manufacturer.

The processor 104 includes a local memory 106 and is in communication with a main memory including a read only memory 108 and a random access memory 110 via a bus 112. The random access memory 110 may be implemented by Synchronous Dynamic Random Access Memory (SDRAM), Dynamic Random Access Memory (DRAM), RAMBUS Dynamic Random Access Memory (RDRAM) and/or any other type of random access memory device. The read only memory 108 may be implemented by a hard drive, flash memory and/or any other desired type of memory device.

The computing devices 18, 24, 26, 28 may also include an interface circuit 114. The interface circuit 114 may be implemented by any type of interface standard, such as, for example, an Ethernet interface, a universal serial bus (USB), and/or a PCI express interface. One or more input devices 116 are connected to the interface circuit 114. The input device(s) 116 permit a user to enter data and commands into the processor 104. The input device(s) 116 may be implemented by, for example, a keyboard, a mouse, a track-pad, a trackball, and/or a voice recognition system. For example, the input device(s) 116 may include any wired or wireless device for providing input from a roaming operator to the computing devices 18, 24, 26, 28.

A visual display, such as the display screen 56 or a display associated with any of the mobile computing devices 18, the test cell computing devices 24, and the remote computing devices 26, is also connected to the interface circuit 114. The visual display may be implemented by, for example, one or more display devices for associated data (e.g., a liquid crystal display, a cathode ray tube display (CRT), etc.).

Further, the computing devices 18, 24, 26, 28 may include one or more network transceivers 118 for connecting to the network 20, such as the Internet, a WLAN, a LAN, a personal network, or any other network for connecting the computing devices 18, 24, 26, 28 to one another and to one or more other computers or network capable devices.

As mentioned above the computing devices 18, 24, 26, 28 may be used to execute machine readable instructions. For example, the computing devices 18, 24, 26, 28 may execute machine readable instructions to perform the methods shown in the block diagram of FIG. 6 and described in more detail below. In such examples, the machine readable instructions comprise a program for execution by a processor such as the processor 104 shown in the example computing devices 18, 24, 26, 28. The program may be embodied in software stored on a tangible computer readable medium such as a CD-ROM, a floppy disk, a hard drive, a digital versatile disk (DVD), a Blu-ray™ disk, or a memory associated with the processor 104, but the entire program and/or parts thereof could alternatively be executed by a device other than the processor 104 and/or embodied in firmware or dedicated hardware. Further, although the example programs are described with reference to the block diagram illustrated in FIG. 6, many other methods of implementing embodiments of the present disclosure may alternatively be used. For example, the order of execution of the blocks may be changed, and/or some of the blocks described may be changed, eliminated, or combined.

INDUSTRIAL APPLICABILITY

In general, the present disclosure may find applicability in many testing facilities for industries including, but not limited to, industrial, earthmoving, agricultural, automotive, aerospace, and other transportation industries and, more particularly, to systems and methods for monitoring and controlling each test cell of a plurality of test cells in a testing facility such that tasks, required to be performed on a test object in each test cell, may be tracked and assigned. By utilizing the systems and methods disclosed herein, the plurality of test cells at a testing facility may be operated in a more efficient manner and/or with a reduced amount of staff. Further, such systems and methods may be implemented as an application on computing devices already based at the testing facility, providing additional cost savings along with the cost savings provided by operating the testing facility with a reduced staff.

In operation, the system 10 may be implemented such that the command center module 30 may present the monitoring pane 58 and the task assignment pane 60 on the display screen 56 of the command computing device 28 via the GUI 54. The task assignment pane 60 may display all of the staff available at the testing facility 12 such as the technicians and roaming operators that are represented by the technician profiles 92 and the roaming operator profiles 94, respectively, which may have been selected by the supervisor from a profile list. The monitoring pane 58 may display all of the test cells 16, represented by corresponding test cell room identifiers 66, that include corresponding test objects 22 being tested. The monitoring pane 58 further displays all of the various tests, which are currently running or are scheduled to run based on instructions via the test instruction module 32, as corresponding test bars 64. Each such test bar 64 may include various tasks, represented by task identifiers 76, which require manual interaction from a staff member 77. As such, the supervisor who is monitoring the monitoring pane 58 and the task assignment pane 60, for example, may assign a particular task to a desired staff member 77 by selecting the corresponding task identifier 76 and dragging and dropping it to a desired one of the supervisor profile 90, the technician profile 92, and the roaming operator profile 94 displayed in the task assignment pane 60. With the task assigned to the desired roaming operator, a notification may be communicated to the mobile computing device 18 associated with the desired roaming operator notifying the roaming operator to perform the task on the test object 22. After the desired roaming operator has completed the task, a completed task notification may be communicated from the mobile computing device 18 to the command computing device 28.

Moreover, a currently running test on a test object 22 may require the attention of an available staff member 77 such that the corresponding row 62 may be redisplayed from the second section 84 to the first section 82 with either the corresponding task identifier 76 or the corresponding warning identifier 89 displayed within the corresponding test bar 64 at the first vertical line 74. With the corresponding row 62 displayed in the first section 82, the supervisor may conveniently view the corresponding task identifier 76 or the corresponding warning identifier 89, along with the corresponding test cell room identifier 66 and the corresponding task name identifier 70, and may assign the particular task to a desired staff member 77 by selecting the corresponding task identifier 76 or warning identifier 89 and dragging and dropping it to a desired profile 90, 92, 94 displayed in the task assignment pane 60. With the task assigned to the desired roaming operator, a notification may be communicated to the mobile computing device 18 associated with the desired roaming operator notifying the desired roaming operator to perform the task on the test object 22. After the desired roaming operator has completed the task, a completed task notification may be communicated from the mobile computing device 18 to the command computing device 28. Similarly, with the task assigned to the desired technician, a notification may be communicated to the remote computing device 26 associated with the desired technician notifying the desired technician to perform the task on the test object 22. After the desired technician has completed the task, a completed task notification may be communicated from the remote computing device 26 to the command computing device 28.

In an exemplary embodiment, the command center module 30 may be configured to selectively focus on a desired test cell 16 and display detailed information associated with the desired test cell 16 such that the supervisor may troubleshoot on-the-fly from the command center computing device 28 and/or assign tasks as needed.

FIG. 6 illustrates a flow chart 600 of a sample sequence of steps which may be performed for remotely monitoring and remotely controlling each test cell of a plurality of test cells in a testing facility such that tasks, required to be performed on a test object in each test cell, may be tracked and assigned. Box 610 illustrates the step of scheduling tests, via a test instruction module 32, to be performed on test objects 22 in corresponding test cells 16. Another step, as illustrated in box 612, may be arming each test cell 16 to verify and indicate corresponding test cells 16 are safe for conducting test operations on the test object 22. Arming each test cell 16 may include receiving an arming input via an arming device 44 disposed exterior to each test cell 16. As illustrated in box 614, another step may be starting the tests. Yet another step, as illustrated in box 616, may be updating test bars 64 to indicate current progress of the tests such that a graphical user interface 54 displays the test bars 64, representing each test scheduled to be performed on each test object 22, on a command center computing device 28. Another step illustrated in box 618 may be updating task identifiers 76 such that the graphical user interface 54 displays the task identifiers 76 representing tasks required to be performed in association with each test scheduled to be performed on each test object 22. A further step, as illustrated in box 620, may be updating task holding identifiers 88 such that the graphical user interface 54 displays the task holding identifiers 88, representing tasks associated with scheduled tests that are not running.

The steps illustrated in boxes 614-620 may be repeated in a continuous loop. While the continuous loop is looping, tasks associated with one of a task identifier 76, a task holding identifier 88, and a warning identifier 89 may be selectively assigned to a staff member 77 by dragging the corresponding one of the task identifier 76, the task holding identifier 88, and the warning identifier 89 to one of a supervisor profile 90, a technician profile 92, and an operator profile 94 presented via the graphical user interface 54 displayed on the command center computing device 28, as illustrated in box 622. Yet another step, as illustrated in box 624, may be communicating the assigned task to one of a mobile computing device 18 associated with the roaming operator profile 94, a remote computing device 26 associated with the technician profile 92, and the command center computing device 28 associated to the supervisor profile 90 alerting to perform the assigned task associated with the test object 22. As illustrated in box 626, another step may be wirelessly communicating, from the mobile computing device 18 associated with the roaming operator to the command center computing device 28, a completed task notification when the assigned task is completed. A completed task notification may also be communicated from the remote computing device 26 associated with the technician profile 92 to the command center computing device 28 when the assigned task is completed by the technician associated with the remote computing device 26.

What is claimed is:

1. A system comprising:
   a plurality of remote computing devices;
   a plurality of test cells in a testing facility,
   the plurality of test cells comprising a plurality of test cell computing devices,
   each remote computing device, of the plurality of remote computing devices, including a remote control module configured to selectively control each test cell computing device of the plurality of test cell computing devices, and
   a test cell, of the plurality of test cells, comprising:
   a plurality of sensors disposed on a test object in the test cell, the test object being a machine component of a vehicle, and the plurality of sensors being configured to monitor parameters of the test object;

a test cell computing device, of the plurality of test cell computing devices, disposed in the test cell, the test cell computing device being configured to:

receive instructions from one of the plurality of remote computing devices, the plurality of remote computing devices being positioned remotely from the plurality of test cells;

control the test object based on the instructions; and receive the monitored parameters, of the test object, from the plurality of sensors; and a door;

a safety system configured to monitor that the test cell remains in a safe testing state during a testing of the test object, the safety system including one or more door sensors disposed on at least one of an interior of the door or an exterior of the door, and the test cell computing device being further configured to at least one of monitor or control the safety system; and a command computing device positioned remotely from the testing facility, the command computing device being configured to:

receive, from the test cell computing device, the monitored parameters of the test object;

generate a warning based on receiving the monitored parameters of the test object; and communicate information associated with the warning to a mobile computing device of a roaming operator located proximate to the test cell.

2. The system of claim 1, wherein the mobile computing device is one of a tablet computer, a cellular phone, or a laptop computer.

3. The system of claim 1, wherein the machine component is an engine.

4. The system of claim 3, further comprising:

a dynamometer coupled to a load of the engine, wherein the test cell computing device is further configured to control operations of the dynamometer based on the instructions.

5. The system of claim 1, wherein the command computing device is further configured to:

present a graphical user interface that includes:

a test bar representing a corresponding test being performed on the test object, a task identifier representing a corresponding task of tasks associated with the test, a supervisor profile representing a supervisor assigned to the task, a technician profile representing a technician assigned to the task, and a roaming operator profile representing a roaming operator assigned to the task.

6. The system of claim 1, further including:

an input device in communication with the command computing device.

7. The system of claim 6, wherein the command computing device is further configured to:

receive a user input, via the input device, responsive to dragging a task identifier, associated with a task, to a roaming operator profile for assigning the task to the roaming operator, the task being associated with a test being performed on the test object.

8. The system of claim 7, wherein the command computing device is further configured to:

present a test bar, representing the test, to display in a first section from a second section, when the task identifier corresponding to the test bar indicates the task requires interaction.

9. The system of claim 1, wherein the safety system further includes:

an arming device configured to receive an arming input after the test cell has been verified to be in the safe testing state.

10. A method comprising:

receiving, by a testing computing device of a plurality of test cell computing devices and from a remote computing device of a plurality of remote computing devices, instructions related to a test to be performed on a test object in a test cell, of a plurality of test cells, that includes the testing computing device, each remote computing device, of the plurality of remote computing devices, including a remote control module configured to selectively control each test cell computing device of the plurality of test cell computing devices, the test object being a machine component of a vehicle, and the remote computing device being positioned remotely from the plurality of test cells;

controlling, by the testing computing device, the test object based on the instructions;

communicating, by the testing computing device, with a safety system that monitors that the test cell remains in a safe testing state during a testing of the test object;

receiving, by the testing computing device, monitored parameters of the test object from one or more sensors disposed on the test object in the test cell; and communicating, by the testing computing device, the monitored parameters to a command center computing device that provides alerts for an assigned task associated with the test object.

11. The method of claim 10, further comprising:

receiving wirelessly, from a mobile computing device associated with a roaming operator profile and by the command center computing device, a completed task notification when the assigned task is completed.

12. The method of claim 10, further comprising:

receiving an arming input via an arming device disposed exterior to the test cell; and arming the test cell based on the arming input.

13. The method of claim 10, further comprising:

identifying a dragging of a warning identifier to one of a supervisor profile, a technician profile, or a roaming operator profile; and assigning the assigned task based on the dragging.

14. The method of claim 10, further comprising:

presenting, via a graphical user interface, task holding identifiers representing tasks associated with scheduled tests that are not running.

15. A testing computing device in a test cell of a plurality of test cells, comprising:

a memory; and one or more processors configured to:
- receive instructions from a remote computing device of a plurality of remote computing devices,
  - the testing computing device being one of a plurality of test cell computing devices,
  - each remote computing device, of the plurality of remote computing devices, including a remote control module configured to selectively control each test cell computing device of the plurality of test cell computing devices,
  - the instructions being for a test of a testing object in the test cell,
  - the testing object being a machine component of a vehicle, and
  - the remote computing device being positioned remotely from the plurality of test cells;
- control the test object based on the instructions;
- communicate with a safety system that monitors that the test cell remains in a safe testing state during a testing of the test object;
- receive monitored parameters from one or more sensors disposed on the test; and
- communicate based on the monitored parameters.

16. The testing computing device of claim 15, wherein the one or more processors are further configured to:
- receive information from a plurality of cameras disposed on one or more of an interior or an exterior of a door of the test cell;
- detect anomalies based on the information from the plurality of cameras; and
- provide an alert based on detecting the anomalies.

17. The testing computing device of claim 15, wherein the one or more sensors include a plurality of sensors.

18. The testing computing device of claim 15, wherein the monitored parameters correspond to one or more of a temperature, a pressure flowrate, a strain, a speed, a torque, or a gas concentration.

19. The testing computing device of claim 15, wherein, when communicating based on the monitored parameters, the one or more processors are further configured to:
- communicate with a mobile computing device of a roaming operator assigned a task associated with the test object.

20. The testing computing device of claim 15, wherein, when communicating based on the monitored parameters, the one or more processors are further configured to:
- communicate with a command computing device located in a command center that includes the remote computing device.

* * * * *